(12) United States Patent
Malhotra et al.

(10) Patent No.: US 10,306,401 B2
(45) Date of Patent: May 28, 2019

(54) SYSTEMS AND METHODS FOR LEARNING AND CONTROLLING AREA ZONES

(71) Applicant: Google Inc., Mountain View, CA (US)

(72) Inventors: Mark Rajan Malhotra, San Mateo, CA (US); Aveek Ravishekhar Purohit, Mountain View, CA (US); Michael Dixon, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 378 days.

(21) Appl. No.: 14/976,985

(22) Filed: Dec. 21, 2015

(65) Prior Publication Data

US 2017/0177013 A1 Jun. 22, 2017

(51) Int. Cl.
*H04W 4/021* (2018.01)
*H04L 12/28* (2006.01)
(Continued)

(52) U.S. Cl.
CPC ............ *H04W 4/021* (2013.01); *G05B 15/02* (2013.01); *G05B 19/042* (2013.01); *G05D 23/1393* (2013.01); *G08B 25/008* (2013.01); *H04L 12/282* (2013.01); *H04L 12/2803* (2013.01); *H04L 12/2809* (2013.01); *H04L 12/2823* (2013.01); *H04L 12/2832* (2013.01); *H04L 67/025* (2013.01); *H04L 67/125* (2013.01); *H04W 4/025* (2013.01); *H04W 24/00* (2013.01); *H05B 37/0227* (2013.01);
(Continued)

(58) Field of Classification Search
CPC ............ G05B 15/02; G05B 2219/2642; H04L 12/2809; H04L 12/282; H04L 12/2823; H04L 2012/2841; H04L 12/2803; H04L 12/2832; H04L 67/025; H04L 67/125; H04W 4/021; H04W 4/025; H04W 4/043; H04W 24/00; H05B 37/0227; H05B 37/0245; G08B 25/008; Y02B 20/44; Y10T 307/773
See application file for complete search history.

(56) References Cited

U.S. PATENT DOCUMENTS 5,652,567 A 7/1997 Traxler et al.
6,073,110 A * 6/2000 Rhodes .................. G06Q 10/06
 705/7.12
(Continued)

FOREIGN PATENT DOCUMENTS

WO 2007128102 A1 11/2007

OTHER PUBLICATIONS

Extended European Search Report dated May 29, 2017 as received in Application No. 16204916.7.

*Primary Examiner* — Crystal J Barnes-Bullock
(74) *Attorney, Agent, or Firm* — Morris & Kamlay LLP

(57) ABSTRACT

A method includes capturing data with a plurality of network connected sensors installed in or around a premises, storing at least a sampling of the data in an electronic storage device, analyzing the stored data with a processor to automatically identify one or more types of trends or patterns, creating, based on the analysis, a zone definition for a first zone that corresponds to an area of the premises from which data was captured by one or more sensors selected from among the plurality of sensors, and configuring at least one system operating in or around the premises automatically based on the first zone definition.

26 Claims, 7 Drawing Sheets

(51) Int. Cl.

| | | |
|---|---|---|
| *G08B 25/00* | (2006.01) | |
| *H04L 29/08* | (2006.01) | |
| *H04W 4/02* | (2018.01) | |
| *H04W 24/00* | (2009.01) | |
| *H05B 37/02* | (2006.01) | |
| *G05B 19/042* | (2006.01) | |
| *G05D 23/13* | (2006.01) | |
| *G05B 15/02* | (2006.01) | |

(52) U.S. Cl.
CPC . *H05B 37/0245* (2013.01); *G05B 2219/2614* (2013.01); *G05B 2219/2642* (2013.01); *H04L 2012/2841* (2013.01)

(56) References Cited

U.S. PATENT DOCUMENTS

| | | | | |
|---|---|---|---|---|
| 6,912,429 | B1* | 6/2005 | Bilger | G08B 25/008 |
| | | | | 236/49.3 |
| 7,602,298 | B2 | 10/2009 | Thomas et al. | |
| 7,746,222 | B2 | 6/2010 | Kogan et al. | |
| 7,868,812 | B2* | 1/2011 | Huthoefer | G01S 7/003 |
| | | | | 342/175 |
| 8,638,211 | B2* | 1/2014 | Cohn | G08B 29/02 |
| | | | | 340/506 |
| 9,412,248 | B1* | 8/2016 | Cohn | G08B 19/005 |
| 9,426,720 | B2* | 8/2016 | Cohn | G08B 29/02 |
| 9,703,276 | B2* | 7/2017 | Piaskowski | G05B 15/02 |
| 2004/0163325 | A1* | 8/2004 | Parrini | B66B 5/022 |
| | | | | 52/1 |
| 2004/0183903 | A1* | 9/2004 | Pedersen | H04N 7/18 |
| | | | | 348/143 |
| 2005/0040943 | A1 | 2/2005 | Winick et al. | |
| 2006/0024020 | A1 | 2/2006 | Badawy | |
| 2008/0125873 | A1 | 5/2008 | Payne et al. | |
| 2010/0235004 | A1* | 9/2010 | Thind | G05B 15/02 |
| | | | | 700/277 |
| 2010/0277300 | A1* | 11/2010 | Cohn | G08B 29/02 |
| | | | | 340/506 |
| 2011/0213588 | A1* | 9/2011 | Lin | G05B 13/048 |
| | | | | 702/181 |
| 2012/0154126 | A1 | 6/2012 | Cohn et al. | |
| 2013/0038430 | A1* | 2/2013 | Blower | H04L 12/2803 |
| | | | | 340/12.22 |
| 2013/0092099 | A1* | 4/2013 | Hardi | A01K 15/023 |
| | | | | 119/721 |
| 2013/0274940 | A1 | 10/2013 | Wei et al. | |
| 2014/0195664 | A1* | 7/2014 | Rahnama | H04W 4/70 |
| | | | | 709/223 |
| 2014/0379141 | A1* | 12/2014 | Patil | F24F 11/0009 |
| | | | | 700/277 |
| 2015/0094860 | A1* | 4/2015 | Finnerty | G05B 15/02 |
| | | | | 700/275 |
| 2015/0120572 | A1 | 4/2015 | Slade et al. | |
| 2015/0293508 | A1* | 10/2015 | Piaskowski | G05B 15/02 |
| | | | | 700/275 |
| 2015/0350031 | A1 | 12/2015 | Burks et al. | |
| 2017/0242413 | A1* | 8/2017 | Piaskowski | G05B 15/02 |

* cited by examiner

| Zone | Devices | Traits |
|---|---|---|
| Z1 | FD_ED01, LRCAM01 | High_Volume_Traffic, Frequent_Occupation |
| Z2 | FD_ED01, LRCAM01, | Frequent_Occupation |
| Z3 | D_HD04, D_CAM02 | Low_Occupation, Low_Traffic |

| Time | Device | Data |
|---|---|---|
| 9/17/2015 5:45:00 PM | FD ED01 | Front door open |
| 9/17/2015 5:45:02 PM | LR CAM01 | Individual detected in living room |
| 9/17/2015 5:45:04 PM | FD ED01 | Front door closed |
| 9/17/2015 5:45:06 PM | LR CAM01 | Individual in LR identified as C |
| ... | ... | ... |
| 9/18/2015 5:46:10 PM | FD ED01 | Front door open |
| 9/18/2015 5:46:12 PM | LR CAM01 | Individual detected in living room |
| 9/18/2015 5:46:14 PM | FD ED01 | Front door closed |
| 9/18/2015 5:46:16 PM | LR CAM01 | Individual in LR identified as C |

SYSTEMS AND METHODS FOR LEARNING AND CONTROLLING AREA ZONES

BACKGROUND

Homes, offices, and other buildings may be equipped with smart networks to provide automated control of devices, appliances and systems, such as heating, ventilation, and air conditioning ("HVAC") system, lighting systems, home theater, entertainment systems, as well as security systems. A security system may include one or more sensors installed throughout a premises. The sensors may, for example, detect movement or changes in light, sound, or temperature.

BRIEF SUMMARY

According to an embodiment of the disclosed subject matter, a system includes a plurality of sensors installed at a premises to capture data from an environment in or around the premises, a memory configured to store the captured data, and a processor configured to determine information about the premises based on the stored data, define one or more zones based on the information, and control an operation of at least one other system at the premises based on the one or more defined zones.

According to another embodiment of the disclosed subject matter, a method includes capturing data with a plurality of network connected sensors installed in or around a premises, storing at least a sampling of the data in an electronic storage device, analyzing the stored data with a processor to automatically identify one or more predetermined types of trends or patterns, creating, based on the analysis, a zone definition for a first zone that corresponds to an area of the premises from which data was captured by one or more sensors selected from among the plurality of sensors, and configuring at least one system operating in or around the premises automatically based on the first zone definition.

According to an embodiment of the disclosed subject matter, means for capturing data with a plurality of network connected sensors installed in or around a premises, storing at least a sampling of the data in an electronic storage device, analyzing the stored data with a processor to automatically identify one or more types of trends or patterns, creating, based on the analysis, a zone definition for a first zone that corresponds to an area of the premises from which data was captured by one or more sensors selected from among the plurality of sensors, and configuring at least one system operating in or around the premises automatically based on the first zone definition are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 6 shows an example zone definitions database according to an embodiment of the disclosed subject matter.

FIG. 7 shows an example data log according to an embodiment of the disclosed subject matter.

DETAILED DESCRIPTION

Figure 1:
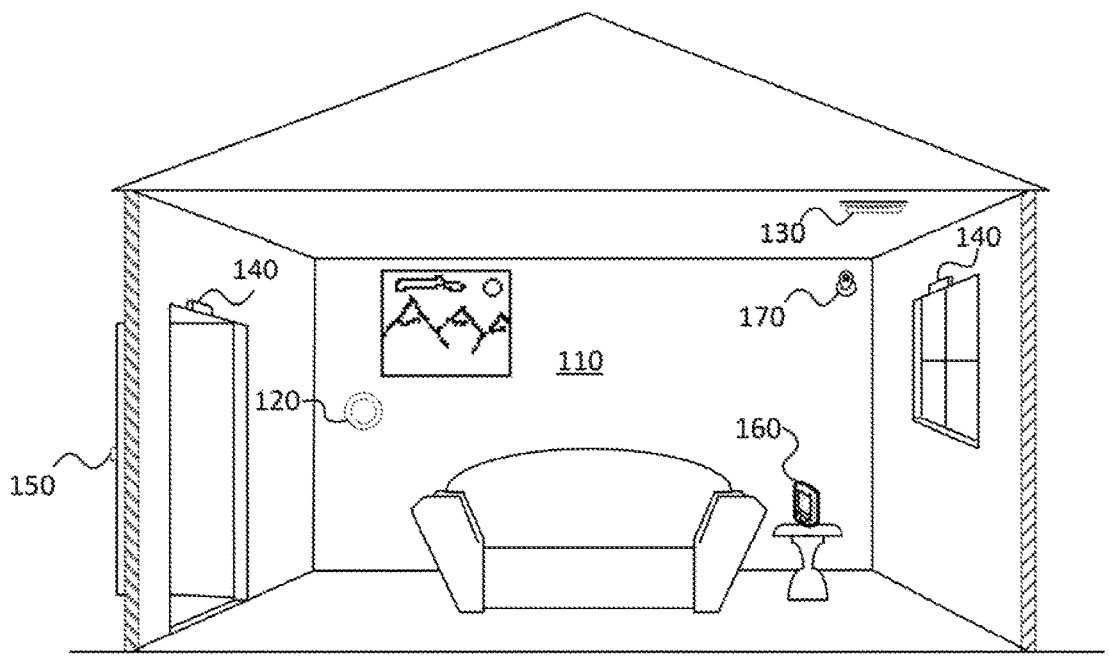
FIG. 1 shows an example premises management system according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosed subject matter may be practiced without these specific details, or with other methods, components, materials, etc. In other instances, well-known structures and devices are shown in block diagram form to facilitate describing the subject disclosure.

Some portions of the detailed description are presented in terms of algorithms and symbolic representations of operations on data bits within a computer memory. These algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "analyzing," "testing," "identifying," "sending," "totaling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Before providing a detailed discussion of the figures, a brief overview will be given to guide the reader. The disclosed subject matter relates to a zoning system that uses one or more techniques to automatically define and identify a plurality of zones within a premises. The zoning system may be configured to improve the accuracy of the boundaries and the characterizations of the zones. Based on the zone definitions, the zoning system may customize various management features for other systems in each respective zone, or transmit information, data or instructions that allows other systems to provide customized services per zone. For example, any of an HVAC, lighting, security, or other type of system may be operated differently in a zone that the zoning system classifies as a low traffic zone compared to a zone that is classified as a high traffic zone.

The disclosed zoning system may be a stand-alone product to be installed in an existing system or may be a default integral component in, for example, a smart-home type of environment that includes sensors, interface components and one or more processing units to process data captured by the sensors. The zoning system may therefore function within an overarching system that has at least some degree of control over or communication with various systems operating in or around the premises, such as the aforementioned HVAC system, lighting system, security system, or the like.

The disclosed zoning system may store data captured by the sensors and analyze the data to extract information about the environment, such as temperature, sound, lighting, presence/absence of a person/pet, movement, etc. The analysis may identify trends, patterns, similarities, or the like in the data, and based on such the zoning system may define one or more zones in or around the premises.

For illustrative purposes and to provide examples of possible communications among different types of systems, the disclosed zoning system will be described below as part of a smart home network environment, which will be referred to generically as a "premises management system."

A premises management system as described herein may include a plurality of electrical and/or mechanical components, including intelligent, sensing, network-connected devices that communicate with each other and/or may communicate with a central server or a cloud-computing system to handle any of a variety of security and/or environmental management objectives in a home, office, building or the like. Such objectives, which may include, for example, managing temperature, managing lawn sprinklers, controlling lights, controlling media, managing alarms, notifying third parties of alarm situations, managing door locks, monitoring the premises for smoke, etc., will collectively be referred to as "premises management."

As mentioned above, a premises management system may include other systems or subsystems to manage different aspects of premises management. For example, a security subsystem may manage the arming, disarming, and activation of alarms and other security aspects of the premises, while a smart home environment subsystem may handle aspects such as light, lawn watering and automated appliances, and an HVAC subsystem may handle adjusting temperature. Each subsystem may include devices, such as sensors, that capture data from the environment. The premises management system may use data captured by the sensors to provide information for the zoning system.

The individual hardware components of the premises management system that are used to monitor and affect the premises in order to carry out premises management in general will hereinafter be referred to as "premises management devices." Premises management devices may include multiple physical hardware and firmware configurations, along with circuitry hardware (e.g., processors, memory, etc.), firmware, and software programming that are capable of carrying out the objectives and functions of the premises management system. The premises management devices may be controlled by a "brain" component, as will be described further below, which may be implemented in a controller device or in one or more of the premises management devices.

Turning now to a more detailed discussion in conjunction with the attached figures, FIG. 1 shows an example premises management system 100 that may include the disclosed zoning system. Installed within a premises 110, the system 100 may include various other subsystems and multiple types of premises management devices, such as one or more intelligent, multi-sensing, network-connected thermostats 120, one or more intelligent, multi-sensing, network-connected hazard detection units 130, one or more intelligent, multi-sensing, network-connected entry detection units 140, one or more network-connected door handles (or door locks) 150, one or more intelligent, multi-sensing, network-connected controller devices 160, and one or more intelligent, multi-sensing, network-connected camera devices 170. Data captured by any of these or other devices may be used by the disclosed zoning system.

The premises management system 100 may be configured to operate as a learning, evolving ecosystem of interconnected devices. New premises management devices may be added, introducing new functionality, expanding existing functionality, or expanding a spatial range of coverage of the system. Furthermore, existing premises management devices may be replaced or removed without causing a failure of the system 100. Such removal may encompass intentional or unintentional removal of components from the system 100 by an authorized user, as well as removal by malfunction (e.g., loss of power, destruction by intruder, etc.). Due to the dynamic nature of the system 100, the overall capability, functionality and objectives of the system 100 may change as the constitution and configuration of the system 100 change. The types of data that may be used by the zoning system may also correspondingly change.

In order to avoid contention and race conditions among the interconnected devices, the disclosed zoning system and the handling of certain decisions, such as those that affect the premises management system 100 at a system level or that involve data from multiple sources, may be centralized in a "brain" component. The brain component may coordinate decision making across subsystems, the entire system 100, or a designated portion thereof. The brain component is a system element at which, for example, sensor/detector states converge, user interaction is interpreted, sensor data is received, subsystems are coordinated, and decisions are made concerning the state, mode, or actions of the system 100. Hereinafter, the system 100 brain component will be referred to as the "primary system processor." The primary system processor may be implemented in the controller device 160, for example, or via software executed or hard coded in a single device, or it may be implemented in a "virtual" configuration, distributed among one or more external servers or one or more premises management devices within the system. The virtual configuration may use computational load sharing, time division, shared storage, and other techniques to handle the primary system processor functions.

The primary system processor may be configured to implement the disclosed zoning system and to execute software to control and/or interact with the other subsystems and components of the premises management system 100. Furthermore, the primary system processor may be communicatively connected to control, receive data from, and transmit data to premises management devices within the system 100 as well as to receive data from and transmit data to devices/systems external to the system 100, such as third party servers, cloud servers, mobile devices, and the like.

Premises management devices (e.g., 120-150, 170) may include one or more sensors. In general, a "sensor" may refer to any device that can obtain information about its local environment and communicate that information in the form of data that may be stored or accessed by other devices and/or systems/subsystems. Sensor data may serve as the basis for information determined about the sensor's environment and as the basis for defining and identifying zones within or around a given premises.

A "zone" as discussed herein may be viewed as a space within or around a given premises that is defined at least in part as an area from which data was captured by selected devices from among a plurality of data sources. Any premises management device that can capture data from the environment can be used as a data source. Furthermore, the number and type of data sources may change, for example, if the premises management system is expanded by having new devices added with different types of sensors and outputs. A brief description of example sensors that can function as data sources that may be included in the system 100 follows.

The examples provided below are not intended to be limiting but are merely provided as illustrative subjects to help facilitate describing the subject matter of the present disclosure. It would be impractical and inefficient to list and describe every type of possible data source. It should be understood that sensors in general are known in the art and deployment of types of sensors that are not specifically described herein will be within the capability of one with ordinary skill in the art.

Sensors may be described by the type of information they collect. In this nomenclature sensor types may include, for example, motion, smoke, carbon monoxide, proximity, temperature, time, physical orientation, position, acceleration, location, entry, presence, pressure, light, sound, and the like. A sensor also may be described in terms of the particular physical device that obtains the environmental data. For example, an accelerometer may obtain acceleration data, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combination thereof.

A sensor further may be described in terms of a function or functions the sensor performs within the system 100. For example, a sensor may be described as a security sensor when it is used to determine security events, such as entry or exit through a door.

A sensor may serve different functions at different times. For example, system 100 may use data from a motion sensor to determine the occurrence of an event, e.g., "individual entered room," or to determine how to control lighting in a room when an individual is present, or use the data as a factor to change a mode of a security system on the basis of unexpected movement when no authorized party is present.

In some cases, a sensor may operate to gather data for multiple types of information sequentially or concurrently, such as where a temperature sensor is used to detect a change in temperature, as well as the presence of a person or animal. A sensor also may operate in different modes (e.g., different sensitivity or threshold settings) at the same or different times. For example, a sensor may be configured to operate in one mode during the day and another mode at night.

Multiple sensors may be arranged in a single physical housing, such as where a single device includes movement, temperature, magnetic, and/or other sensors. Such a housing may still be generally referred to as a "sensor" or a premises management device. For clarity, sensors may also be described with respect to the particular functions they perform and/or the particular physical hardware used when such specification is beneficial for understanding of the embodiments disclosed herein.

Figure 2:
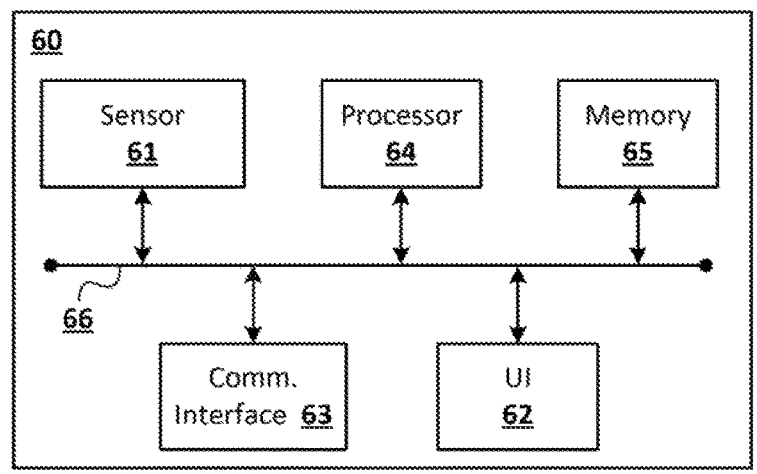
FIG. 2 shows an example premises management device according to an embodiment of the disclosed subject matter.

FIG. 2 shows an example premises management device 60 including a processor 64, a memory 65, a user interface 62, a communications interface 63, an internal bus 66, and a sensor 61. A person of ordinary skill in the art would appreciate that components of the premises management device 60 described herein can include electrical circuit(s) that are not illustrated, including components and circuitry elements of sufficient function in order to implement the device as required by embodiments of the subject disclosure. Furthermore, it can be appreciated that many of the various components listed above can be implemented on one or more integrated circuit (IC) chips. For example, a set of components can be implemented in a single IC chip, or one or more components may be fabricated or implemented on separate IC chips.

The sensor 61 may be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, imager, camera, compass or any other type of sensor that captures data or provides a type of information about the environment in which the premises management device 60 is located.

The processor 64 may be a central processing unit (CPU) or other type of processor, chip, or circuit. The processor 64 may be communicably connected to the other components to receive, transmit and analyze data captured by the sensor 61, to transmit messages, packets, or instructions that control operation of other components of the premises management device 60 and/or external devices, and to process communication transmissions between the premises management device 60 and other devices. The processor 64 may execute instructions and/or computer executable components stored on the memory 65. Such computer executable components may include, for example, a primary function component to control a primary function of the premises management device 60 related to managing a premises, a communication component configured to locate and communicate with other compatible premises management devices, and a computational component configured to process system related tasks.

The memory 65 or another memory device in the premises management device 60 may store computer executable components and also be communicably connected to receive and store environmental data captured by the sensor 61. A communication interface 63 may function to transmit and receive data using a wireless protocol, such as WiFi, Thread, other wireless interfaces, Ethernet, other local network interfaces, Bluetooth®, other radio interfaces, or the like, and may facilitate transmission and receipt of data by the premises management device 60 to and from other devices.

The user interface (UI) 62 may provide information and/or receive input from a user of system 100. The UI 62 may include, for example, a speaker to output an audible sound when an event is detected by the premises management device 60. Alternatively, or in addition, the UI 62 may include a light to be activated when an event is detected by the premises management device 60. The user interface may be relatively minimal, such as a liquid crystal display (LCD), light-emitting diode (LED) display, an LED or limited-output display, or it may be a full-featured interface such as, for example, a touchscreen, touchpad, keypad, or selection wheel with a click-button mechanism to enter input.

Internal components of the premises management device 60 may communicate via the internal bus 66 or other mechanisms, as will be readily understood by one of skill in the art. One or more components may be implemented in a single physical arrangement, such as where multiple components are implemented on a single integrated circuit. Premises management devices 60 as disclosed herein may include other components, and/or may not include all of the illustrative components shown.

As previously mentioned, sensor 61 captures data about the environment in or around the premises, and at least some of the data may be converted into information that may be used by the disclosed zoning system to automatically define zones. Through the bus 66 and/or communication interface 63, zone information and other functions may be transmitted to or accessible by other components or subsystems of the premises management system 100.

Figure 3:
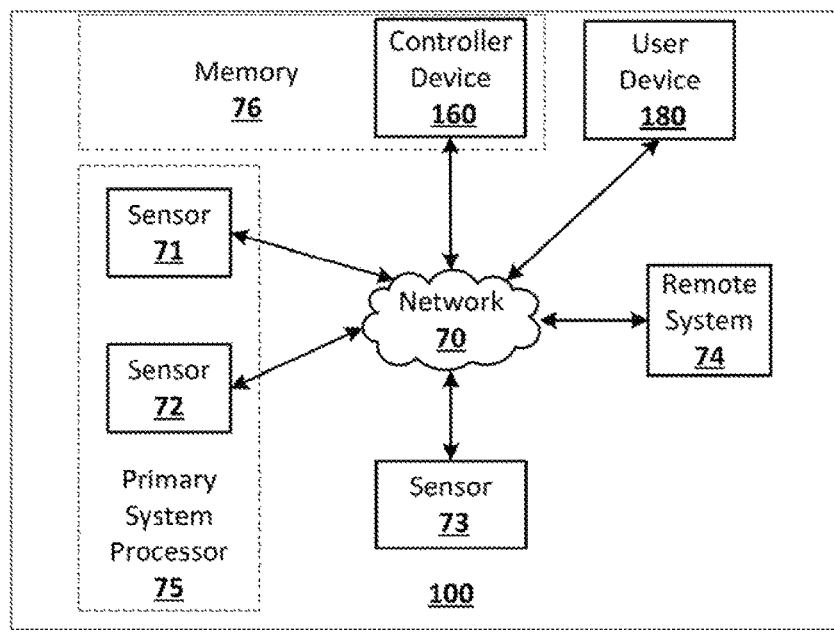
FIG. 3 shows a diagram example of a premises management system which may include an embodiment of the zoning system according to an embodiment of the disclosed subject matter.

FIG. 3 shows a diagram example of a premises management system 100 which may include an embodiment of the zoning system as disclosed herein. System 100 may be implemented over any suitable wired and/or wireless communication networks. One or more premises management devices, i.e., sensors 71, 72, 73, and one or more controller devices 160 (e.g., controller device 160 as shown in FIG. 1) may communicate via a local network 70, such as a WiFi or other suitable network, with each other. The network 70 may include a mesh-type network such as Thread, which provides network architecture and/or protocols for devices to communicate with one another. A user may interact with the premises management system 100, for example, using a user device 180, such as a computer, laptop, tablet, mobile phone, watch, wearable technology, mobile computing device, or using the controller device 160.

In the diagram of FIG. 3 a primary system processor 75 is shown implemented in a distributed configuration over sensors 71 and 72, and a memory 76 is shown implemented in controller device 160. However, the controller device 160 and/or any one or more of the sensors 71, 72, 73, may be configured to implement the primary system processor 75 and memory 76 or any other storage component required to store data and/or applications accessible by the primary system processor 75. The primary system processor 75 may implement the disclosed zoning system and may receive, aggregate, analyze, and/or share information received from the sensors 71, 72, 73, and the controller device 160. Furthermore, a portion or percentage of the primary system processor 75 and/or memory 76 may be implemented in a remote system 74, such as a cloud-based reporting and/or analysis system.

The premises management system 100 shown in FIG. 3 may be a part of a smart-home environment which may include a structure, such as a house, apartment, office building, garage, factory, mobile home, or the like. The system 100 can control and/or be coupled to devices inside or outside of the structure. One or more of the sensors 71, 72 may be located inside the structure or outside the structure at one or more distances from the structure (e.g., sensors 71, 72 may be disposed at points along a land perimeter on which the structure is located, such as a fence or the like).

Sensors 71, 72, 73 may communicate with each other, the controller device 160 and the primary system processor 75 within a private, secure, local communication network that may be implemented wired or wirelessly, and/or a sensor-specific network through which sensors 71, 72, 73 may communicate with one another and/or with dedicated other devices. Alternatively, as shown in FIG. 3, one or more sensors 71, 72, 73 may communicate via a common local network 70, such as a Wi-Fi, Thread or other suitable network, with each other and/or with a controller 160 and primary system processor 75. Sensors 71, 72, 73 may also be configured to communicate directly with the remote system 74.

Sensors 71, 72, 73 may be implemented in a plurality of premises management devices, such as intelligent, multi-sensing, network-connected devices, that can integrate seamlessly with each other and/or with a central processing system or a cloud-computing system (e.g., primary system processor 75 and/or remote system 74). Such devices may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72, 73 shown in FIG. 3. These premises management devices may be used by the disclosed zoning system to identify zones, but may also execute a separate, primary function.

For example, a smart thermostat may detect ambient climate characteristics (e.g., temperature and/or humidity) and may be used to control an HVAC system. In other words, ambient client characteristics may be detected by a sensor, e.g., sensor 73 shown in FIG. 3, and the controller 160 may control the HVAC system (not shown) of the structure based on data captured by sensor 73. However, a pattern of low temperature detected by sensor 73 over a period of time may also provide data that can serve as part of a basis for defining a zone, as will be described further below.

As another example, a smart hazard detector may detect light and the presence of a hazardous substance or a substance indicative of a hazardous substance (e.g., smoke, fire, or carbon monoxide). Light, smoke, fire, carbon monoxide, and/or other gasses may be detected by a sensor, e.g., sensor 71, shown in FIG. 3, and the controller 160 may control an alarm system to provide a visual and/or audible alarm to the user of the smart-home environment based on data from sensor 71. However, data captured by sensor 71 regarding light in a room over a period of time may also server as part of a basis for defining a zone.

As another example, one or more intelligent, multi-sensing, network-connected entry detectors (e.g., "smart entry detectors") may be specifically designed to function as part of a security subsystem. Such detectors may be or include one or more of the sensors 71, 72, 73 shown in FIG.

3. The smart entry detectors may be disposed at one or more windows, doors, and other entry points of the smart-home environment for detecting when a window, door, or other entry point is opened, broken, breached, and/or compromised. The smart entry detectors may generate a corresponding detection signal to be transmitted to the controller 160, primary system processor 75, and/or the remote system 74 when a window or door is opened, closed, breached, and/or compromised. The detection signal may also provide data to the zoning system that may serves as the basis defining a high or low traffic zone.

Smart thermostats, smart hazard detectors, smart doorbells, smart entry detectors, and other premise management devices of the system 100 (e.g., as illustrated as sensors 71, 72, 73 of FIG. 3) can be communicatively connected to each other via the network 70, and to the controller 160, primary system processor 75, and/or remote system 74.

The disclosed zoning system may also include user specific features. Generally, users of the premises management system 100 may interact with the system 100 at varying permission and authorization levels. For example, users may have accounts of varying class with the system 100, each class having access to different features, such as the ability to adjust or define zones.

Users may be identified as account holders and/or verified for communication of control commands. For example, some or all of the users (e.g., individuals who live in a home) can register an electronic device, token, and/or key FOB with the premises management system 100. Such registration can be entered, for example, at a website, a system 100 interface (e.g., controller device 160), or a central server (e.g., the remote system 74) to bind the user and/or the electronic device to an account recognized by the system 100. Registered electronic devices may be permitted to control certain features of the system 100 and to confirm or customize zones defined by the zoning system. A user can use their registered electronic device to locally or remotely control the system 100, such as when the user is at work or on vacation, or communicate with the network-connected smart devices. For example, the system 100 can detect the arrival or departure of a user based on communications from a registered device. This data may also be used by the zoning system to characterize a zone as frequently or infrequently occupied.

Alternatively, or in addition to registering electronic devices, the premises management system 100 may make inferences about which individuals live in the home and are therefore users and which electronic devices are associated with those individuals. As such, the system 100 may "learn" who is a user (e.g., an inferred authorized user) and may use this data to augment zoning definitions and may respond to communications from the electronic devices associated with those individuals, e.g., executing applications to control the network-connected smart devices of the system 100 or to confirm or customize zones.

The controller device 160 may be implemented using a general- or special-purpose computing device. A general-purpose computing device running one or more applications, for example, may collect and analyze data from one or more sensors 71, 72, 73 within the home, define zones, and thereby function as controller device 160. In this case, the controller device 160 may be implemented using a computer, mobile computing device, mobile phone, tablet computer, laptop computer, personal data assistant, wearable technology, or the like. In another example, a special-purpose computing device may be configured with a dedicated set of functions and a housing with a dedicated interface for such functions. This type of controller device 160 may be optimized for certain functions and presentations, for example, including an interface specially designed to review a data log of the zoning system and create customized zones, as will be described further below.

The controller device 160 may function locally with respect to the sensors 71, 72, 73 with which it communicates and from which it obtains sensor data, such as in the case where it is positioned within a home that has a premises management system 100 installed therein. Alternatively or in addition, controller device 160 may be remote from the sensors 71, 72, 73, such as where the controller device 160 is implemented as a cloud-based system that communicates with multiple sensors 71, 72, 73, which may be located at multiple locations and may be local or remote with respect to one another.

Figure 4:
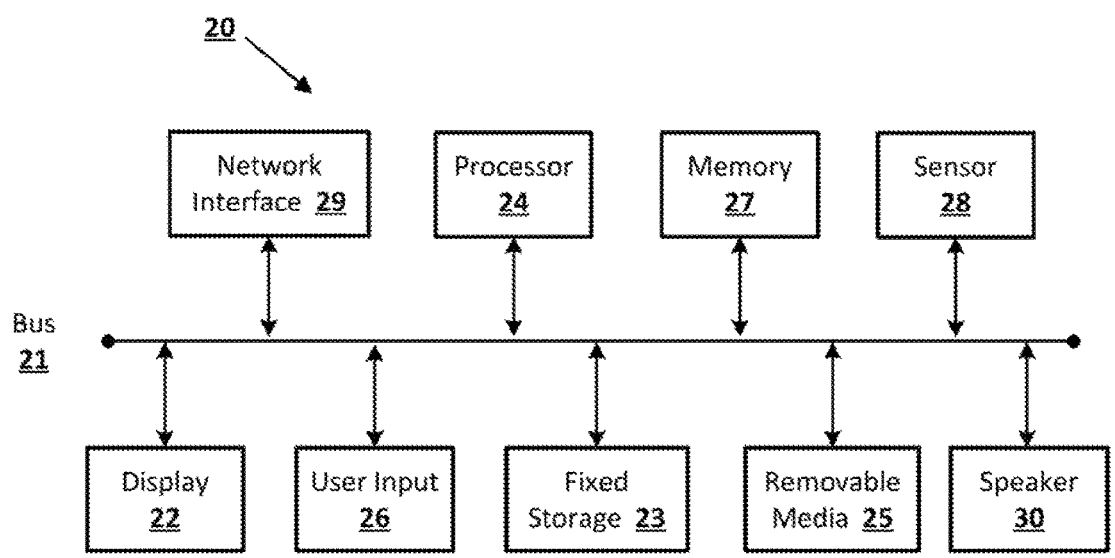
FIG. 4 shows an example computing device suitable for implementing a controller device according to an embodiment of the disclosed subject matter.

FIG. 4 shows an example computing device 20 suitable for implementing the controller device 160. The computing device 20 may include a bus 21 that interconnects major components of the computing device 20. Such components may include a central processor 24; a memory 27, such as Random Access Memory (RAM), Read Only Memory (ROM), flash RAM, or the like; a sensor 28, which may include one or more sensors as previously discussed herein; a user display 22, such as a display screen; a user input interface 26, which may include one or more user input devices such as a keyboard, mouse, keypad, touch pad, turn-wheel, and the like; a fixed storage 23 such as a hard drive, flash storage, and the like; a removable media component 25 operable to control and receive a solid-state memory device, an optical disk, a flash drive, and the like; a network interface 29 operable to communicate with one or more remote devices via a suitable network connection; and a speaker 30 to output an audible communication to the user. In some embodiments the user input interface 26 and the user display 22 may be combined, such as in the form of a touch screen.

The bus 21 allows data communication between the central processor 24 and one or more memory components 25, 27, which may include RAM, ROM, and other memory, as previously noted. Applications resident with the computing device 20 are generally stored on and accessed via a computer readable storage medium.

The fixed storage 23 may be integral with the computing device 20 or may be separate and accessed through other interfaces. The network interface 29 may provide a direct connection to the premises management system and/or a remote server via a wired or wireless connection. The network interface 29 may provide such connection using any suitable technique and protocol, as will be readily understood by one of skill in the art, including digital cellular telephone, WiFi, Thread, Bluetooth®, near-field, and the like. For example, the network interface 29 may allow the computing device 20 to communicate with other components of the premises management system, other computers via one or more local, wide-area, or other communication networks, as described in further detail herein.

Figure 5A:
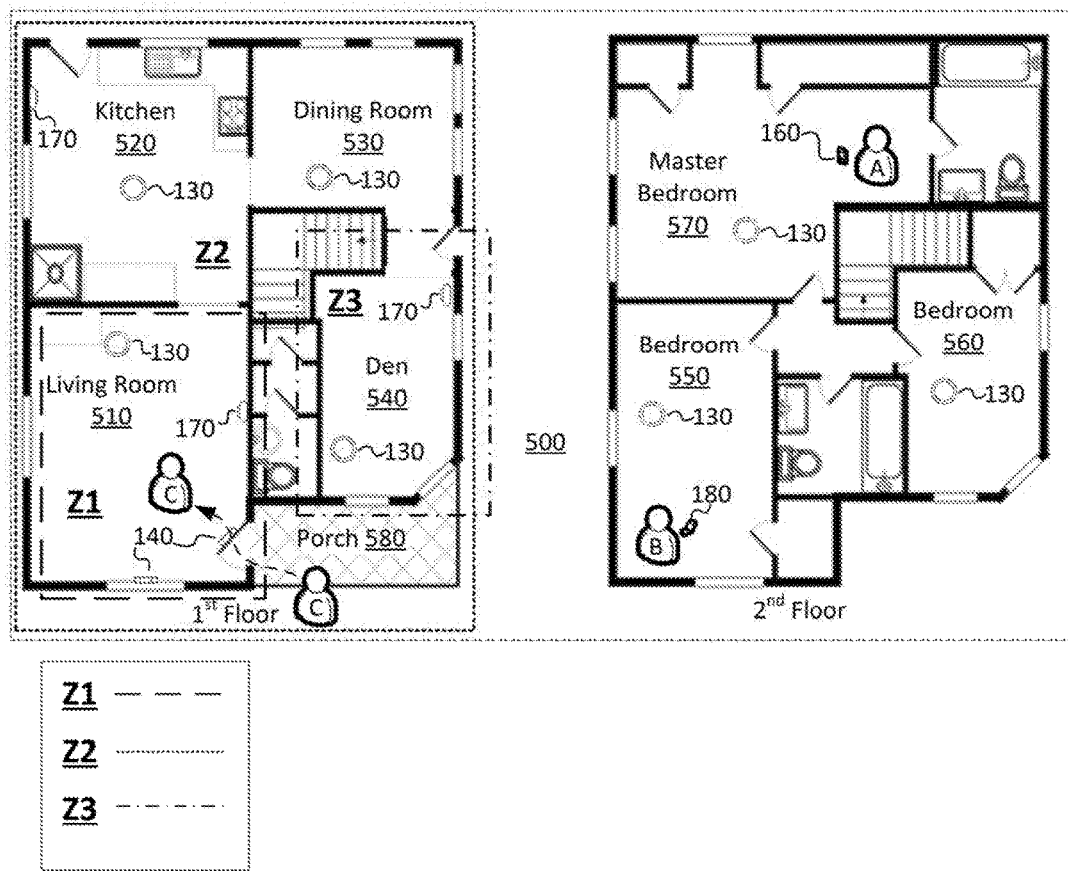
FIG. 5A shows a layout of a two-floor house 500 including an example premises management system installed therein according to an embodiment of the disclosed subject matter.

FIG. 5A shows a layout of a two-floor house 500 including an example premises management system installed therein. The house 500 includes a living room 510, kitchen 520, dining room 530, den 540, bedroom 550, bedroom 560, master bedroom 570, and porch 580.

A premises management system 100 installed in the house 500 includes an embodiment of the disclosed zoning system. Referring to FIGS. 1 and 5, the system 100 may include network-connected hazard detection units 130 installed throughout the house 500, network-connected entry detection units 140 installed at windows and doors throughout the house, a network-connected controller device 160, and network connected cameras 170. For simplicity and to avoid unnecessary clutter in the figure, only one window entry detection unit 140, one door entry detection unit 140, and two cameras 170 are illustrated, but it should be understood that entry detection units 140 may be installed at multiple windows and/or doors throughout the house 500, cameras 170 may be installed in other rooms and outside of the house 500, and that other premise management devices (e.g., smart thermostats, smart doorbells, motion detectors, light detectors etc.) as described above may be installed as part of the system 100.

Figure 5B:
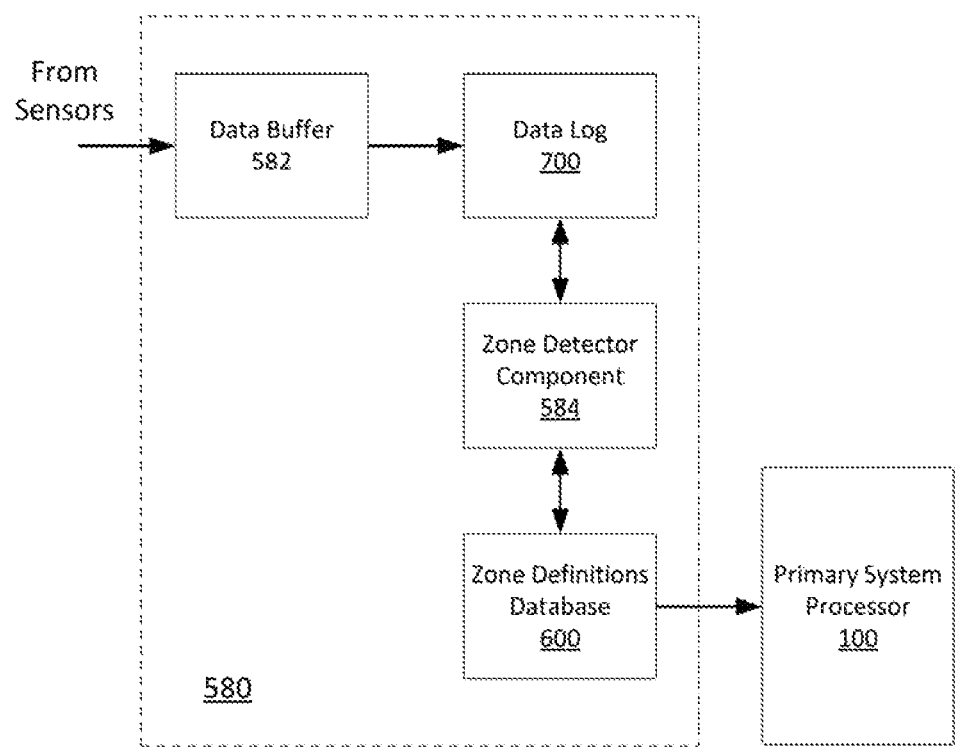
FIG. 5B shows a zoning system according to an embodiment of the disclosed subject matter.

FIG. 5B shows an embodiment of a zoning system 580 that may be implemented within the premises management system 100 in the premises 500. The zoning system 580 may include a data buffer 582, a data log 700, a zone detector component 584, and a zone definitions database 600. The zoning system 580 may be configured to store and analyze data captured by sensors on premises management devices 130, 140, 160, 170.

The data buffer 582 may receive and temporarily store data from sensors on an on-going basis. The data log 700 may selectively store data from the data buffer 582. For example, the data log 700 may store data according to a rule or algorithm that is applied based on an amount of storage space available in the system. An example rule may be to only store data samples on a periodic basis, or to only store data when there is a change in the data above a threshold amount, or to only store data from select devices, or other rules that may reduce or classify the amount and/or type of data that is stored long term in the data log 700. Furthermore, the data log 700 may be configured to store data for a set period of time, e.g., one week, the last 30 days, the last 90 days, or the like.

The data storage rule and data storage period applied by the data log 700 may change, for example, based on a command or setting, based on available storage capacity, or based on a given mode of the zoning system 580. For example, if the zoning system 580 is configured to be implemented by premises management devices in a dynamic premises management system 100, then the data storage capacity may change when new devices are added or removed from the system, and the data storage rule may be automatically adjusted accordingly.

Several different examples of how the disclosed zoning system may define zones will now be provided. It should be understood that the disclosed subject matter is not limited to these specific examples, rather, these examples are provided to facilitate understanding of the system. A person of ordinary skill in the art may implement additional zone definitions within the scope of this disclosure that are not included here based on the principles disclosed herein.

The zone detector component 584 may analyze data stored in the data log 700 to determine one or more data sources that may be classified as a zone under one or more rules or algorithms that will generally be referred to herein as "zoning rules." Broadly, the zoning rules may include techniques for searching for patterns, trends, or similarities in the data, and extracting information from such to serve as the basis for defining a zone. The zoning rules may further comprise conditions for identifying or characterizing traits of a defined zone. Zoning traits may provide additional, useful and actionable information to other components of the premises management system 100.

Referring to FIG. 5A, in the living room 510 camera 170 and entry detector 140 both may detect the entry of individual C into the home every weekday at approximately 5:45. Data indicating this daily entry may be stored in the data log 700 with an associated date and time, as shown in FIG. 7.

Zoning rules may be created to identify contiguous areas. A first example zoning rule may be to search for data sets that indicate two or more data sources have captured events simultaneously or within a set window of time, e.g. 5 seconds. Here, an "event" may be defined as data that indicates a detected change in an environment. An event could be a detected motion, a change in light, a change in temperature, a change in sound, etc. If a set of two more data sources detect events within the time window at least a threshold number of times, the area from which the data sources are capturing data may be defined as a zone.

An example implementation of the first example zoning rule follows. The zone detector component 584 may detect a pattern in the data and define a zone due to the repeated arrivals of users. Specifically, FIG. 7 shows an example data log 700. The stored data shows multiple occasions in which, when the front door entry detection unit 140 (referred to as "FD ED01" in FIG. 7) detects an entry event, the living room camera 170 (referred to as "LR CAM01" in FIG. 7) detects an individual in the living room shortly thereafter. These events repeatedly occur within a window of time less than 5 seconds. Accordingly, the zone detector component 584 may determine that these two components are functionally collocated and define a zone Z1 as an area in the premises 500 from which data is captured by these two units.

In this example case zone Z1 corresponds to the living room 510, however, a zone need not correspond to a room. Any area from which one or more sensors may capture data can be combined into a zone depending on the applicable zoning rule. For example, a second zoning rule may be to search for data sets that indicate two or more data sources have captured events simultaneously or within a set window of time of 5 hours. In this case, an entire floor may defined as a zone Z2, shown in FIG. 5. It should further be clear that zones do not need to be exclusive areas, but may overlap, coincide or be nested inside another zone.

Conversely, a zoning rule may be based on the absence of events. For example, a third zoning rule may be to search the data log 700 to identify data sources that have a last detected event at a time greater than a threshold amount, e.g., no detected event for the last 14 hours. In FIG. 5, data may show that sensors on premises management devices located in the den 540, e.g., camera 170 and hazard detector 130, rarely detect events. Based on the third zoning rule, the zone detector component 584 may determine that these two components are functionally collocated and define a zone Z3 as an area in the premises 500 from which data is captured by these two units.

Zoning rules may also be based on data from specific types sensors. For example, a fourth zoning rule may be to search for data sources that indicate a temperature, light, or sound level within a threshold range. Based on the fourth zoning rule, the zone detector component 584 may determine that components that are detecting a same or similar amount of light are functionally collocated and define a zone as an area in the premises 500 from which data is captured by such units.

Although each of these example zoning rules describe a single factor, multiple factors may be included in a zoning rule. Furthermore, zoning rules may be compounded to include other defined zones. For example, a zoning rule may be created to identify zones that: a) receive at least a threshold amount of light, b) for at least a threshold amount of time, c) after 7:00 PM, d) outside of zone Z2.

In addition, information to characterize one or more traits of a zones may be drawn from the stored data and included in the zone definitions. In other words, a zone definition may include a data component that indicates one or more traits of the zone. For example, the data in the data log 700 may show that events are detected frequently in certain zones. A zoning rule may incorporate a condition that if, on average, devices in a zone detect events at a rate above a set threshold, a "high traffic" trait value may be added to that zone's definition data. Conversely, a condition may be that if, on average, devices in a zone detect events at a rate below a set threshold, a "low traffic" trait value is added to that zone's definition data. In another example, the data may show that certain zones have sustained events, which may indicate prolonged occupancy. A zoning rule may include a condition that a zone that has greater than a threshold number of events that are, on average, are sustained over a threshold amount of time then a "high occupancy" trait value is added to that zone.

As shown in FIG. 5B, when the zone detector component 584 identifies zones, the zone detector component 584 may store the zone definitions in a zone definitions database 600. FIG. 6 shows an example zone definitions database 600. The zone definition may include which devices detect data from the area that defines the zone and one or more trait values that have been added to the zone definition.

The zoning system may include a user interface to provide access to the zone definition database 600. An authorized user may confirm, edit or delete zone definitions, as well as create his or her own custom zone definitions. For example, the interface may notify the user when a new zone is created. The user may be prompted to confirm, add devices to or remove devices from the new zone definition, to adjust the traits of the zone, or adjust the action the system will take in a zone. In addition, a user may provide customized labels for zones and devices. For example, a user could label zone Z3 in FIG. 5A as "1$^{st}$ Floor" and label each device with user friendly labels, e.g., "Living Room Hazard Detector," "Front Door Entry Detector" or the like.

Although general terms such as "low/high traffic" are used in FIG. 6 for the purpose of illustration, it should be clear that any number of degrees may exist for a trait value that characterizes a zone. Furthermore, although only "traffic" and "occupancy" are shown for the purpose of illustration, it should be clear that many different types of traits can be measured depending upon the available data and many different types of characterizing values and conditions may be implemented. For example and without limitation, zones may be characterized by degrees ranging from low to high in traffic, occupancy, light, sound, motion, temperature, number of times a specific event occurs (e.g., security alarm triggered), etc.

Furthermore, the zone traits may indicate the type of occupant (e.g., pet or individual) or identity of occupant (e.g., person identified by image or electronic communication from a carried device) that frequents the zone or is detected in the zone above a threshold amount. In the example shown in FIG. 5A, users A, B, and C are registered users of the system 100. A zone may be characterized to indicate, for example, where a given user spends an amount of time above a threshold amount, e.g., a zone may characterized as a "frequent" or "favorite" spot for a given user and systems may be automatically set based on that user's preferences.

As shown in FIG. 5B, the zoning system may be configured to provide instructions/data to the premises management system 100. Other systems or subsystems may be adjusted based on the information stored in the zone definitions database 600. Depending on the capabilities of the given configuration of the premises management system, any number of settings may be customized to provide a more efficient, pleasant and enjoyable environment for users of the premises 500. Several example customizations will now be described, however, it will be clear to a person of ordinary skill in the art that given the breath of description provided above, too many other configurations, combinations and customizations exist to be listed and described here. These examples are not intended to be limiting, but to provide illustrations to facilitate an understanding of the disclosed subject matter.

A first example customization may relate to improvements to a security system. A typical home security system includes a STAY mode in which detections by internal security sensors are disregarded for the purpose of triggering an alarm while external sensor detections may trigger an alarm, an AWAY mode in which a detection from any sensor internal or external can trigger an alarm, and an OFF mode in which detections from any sensor internal or external are disregarded for the purpose of triggering an alarm. Using the disclosed zoning system, zones can receive customized alarm settings. At least one drawback of the OFF/STAY/AWAY paradigm is that areas that could or should receive a customized level of attention are unintelligently covered by blanket assignment. For example, a home in OFF mode is virtually unprotected by the system, but the user that is home and wishes to have easy ingress and egress is left with no other option.

Using the disclosed zoning system, a home may, instead of being forced to shut of all sensors, operate on a zone basis. The zoning system may have "learned" that certain areas, such as a storage room in the basement that has a window, or a guest room on a top floor, have low occupation or low traffic. Nevertheless, these are still potential entry points for a unauthorized individual, particularly if the individual is observing the home and aware that the security system is likely switched to an OFF state. Accordingly, when the user switches the security system to OFF, the premises management system may continue to monitor the low occupation, low traffic areas. If motion is detected there, a notification may sent to the authorized users or an alarm may be triggered.

Similarly, when a user goes to sleep and switches to AWAY mode, rather than disregarding all internal sensors in a sweeping blanket assignment, a system using the disclosed zoning system can continue to monitor areas within the premises in which little to no motion is expected in order to check for an event that is out of the ordinary.

In another area of potential improvement to a security system, false alarms can be a significant problem leading to annoyance and fines against the user. However, a system using the disclosed zoning system can track a zone that sometimes generates a false alarm event, e.g., a side screen door that occasionally swings open and causes a false alarm. When an alarm event is triggered in this zone, rather than automatically triggering an alarm, the system can send a notification to the registered user first to confirm whether a true alarm event has occurred.

Another example use of the disclosed zoning system relates to improvements to an HVAC system. A typical HVAC system in a home has a temperature setting that must be set by the user. If the user leaves the house and the house is empty, the HVAC system may continue to function heating or cooling the home unnecessarily, leading to waste and expense. A premises management system including the disclosed zoning system can learn times that the home will normally be empty and times that the house will normally be occupied. Based on this information, the HVAC system can be automated and controlled more efficiently.

Furthermore, in homes that have separate HVAC systems, e.g., an upstairs and a downstairs system or other arrangement, each system may be controlled more efficiently based on zoning information. The system can use less energy heating or cooling an area that the zoning system has learned is frequently unoccupied during certain times, e.g., the system can be automatically controlled to use less energy to heat or cool an unfinished basement that the zoning system has defined as a low traffic, low occupancy zone.

Similar to HVAC, a lighting system can also benefit from the disclosed zoning system. Lights left on in rooms that are infrequently used or left on after falling asleep can waste energy and needlessly increase utility expenses. A premises management system including the disclosed zoning system may detect that a light is on in a zone that is normally dark or at a time that the zone is normally dark. If the light remains on past a threshold amount of time, the system may send a notification asking the user to confirm that the light should be on. If no confirmation is received, the system may automatically turn off the light in that zone.

Another advantage that the disclose zoning system provides is that the zoning definitions may be dynamically managed. For example, an unfinished basement may remain largely unused for several months but eventually be finished and converted into an oft used play room. The zoning system can initially characterize a zone corresponding to the basement as low traffic and low occupancy, but automatically adjust the zone definition to reflect the new use of the space. The applicable security, HVAC, lighting, etc. controls of the space will automatically be adjusted accordingly.

Figure 8:
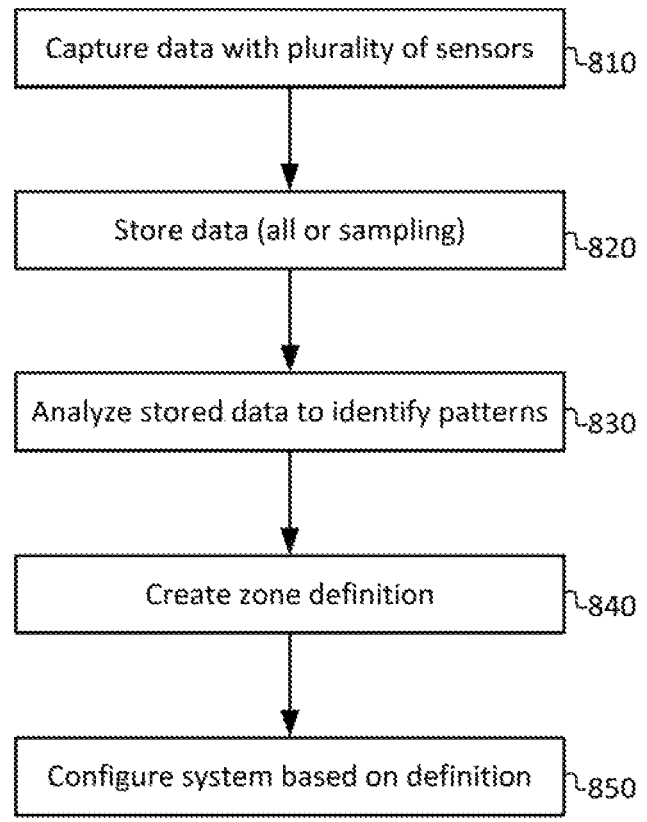
FIG. 8 shows a flowchart according to an embodiment of the disclosed subject matter.

FIG. 8 shows a flowchart of operations of an embodiment of the disclosed zoning system. At operation 810 a plurality of network-connected sensors capture data from the environment in and/or around a premises. The data capture may continue on an on-going basis and may include any type of measurable aspect of the environment (e.g., light, sound, motion, temperature, smoke, etc.).

At operation 820 the data is stored. Depending on the capacity and capability of the system the data may be stored in a temporary buffer and a sampling of the data from the buffer stored to a longer term storage device, or all data may be directly stored to the longer term storage device.

At operation 830 a processor analyzes the data to automatically identify one or more predetermined types of trends or patterns, for example, by executing one or more zoning rules as described above.

At operation 840 the processor creates, based on the analysis, a zone definition for at least a first zone that corresponds to an area of the premises from which data was captured by one or more sensors selected from among the plurality of sensors. The zone definition may include at least one trait value component that indicates or describes a trait of the zone, such as "high traffic," "low occupancy," "frequent use by pets," "frequent use by User C," etc.

At operation 850 at least one system operating in or around the premises is configured automatically based on the first zone definition. For example, a security system set to STAY may increase the security mode in a zone based on the zone being defined as a "low occupancy" zone, a lighting system may turn off lights left on for a long period of time in a "low occupancy/low traffic" zone, an HVAC system may customize the temperature in a zone that is defined as "frequent use by User C" to the temperature that User C often prefers, etc.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

The aforementioned systems/circuits/components have been described with respect to interaction between several components/blocks. A person of ordinary skill in the art would appreciate that such systems/circuits and components/blocks can include those components or specified sub-components, some of the specified components or sub-components, and/or additional components, according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of ordinary skill in the art.

While, for purposes of simplicity of explanation, some of the disclosed methodologies are shown and described as a series of acts within the context of various block diagrams and flowcharts, it is to be understood and appreciated that embodiments of the disclosure are not limited by the order of operations, as some operations may occur in different orders and/or concurrently with other operations from that shown and described herein. For example, those skilled in the art will understand and appreciate that a methodology can alternatively be represented as a series of interrelated states or events, such as in a state diagram. Moreover, not all illustrated operations may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
a plurality of sensors installed at a premises to capture data from an environment in or around the premises;
a memory configured to store the captured data; and
a processor configured to:
determine information about the premises based on the stored data,
create one or more zone definitions that define one or more zones based on the information, each zone definition including a designation of one or more sensors from among the plurality of sensors, and
control an operation of at least one other system at the premises based on the one or more defined zones;
wherein the one or more zones are defined by one or more zoning rules, a first zoning rule being to search for data sets that indicate two or more sensors have captured events simultaneously or within a predetermined time window.

2. The system of claim 1, wherein each of the one or more zones corresponds to a contiguous area in or around the premises.

3. The system of claim 2, wherein the at least one other system includes a heating, ventilation, and air conditioning ("HVAC") system.

4. The system of claim 3, wherein a temperature setting of the HVAC system is automatically set in at least one section of the premises that corresponds to a first zone based on a first zone definition stored in the storage device.

5. The system of claim 1, further comprising a storage device to store one or more zone definitions.

6. The system of claim 5, wherein each zone corresponds to an area in or around the premises from which data was captured by the designated one or more sensors.

7. The system of claim 5, wherein at least one zone definition includes one or more trait value components that indicate one or more traits of the zone.

8. The system of claim 7, wherein at least one of the one or more trait values indicates an occupancy level of the corresponding zone.

9. The system of claim 7, wherein at least one of the one or more trait values indicates a traffic level of the corresponding zone.

10. The system of claim 7, wherein at least one of the one or more traits indicates a type of occupant that frequents the corresponding zone.

11. The system of claim 7, wherein the processor is configured to determine the one or more traits based on a set of one or more rules applied to the stored data.

12. The system of claim 5, further comprising an interface configured to provide a user with access to the storage device to modify or create zone definitions.

13. The system of claim 5, wherein the at least one other system includes a security system.

14. The system of claim 13, wherein a security mode of the security system is automatically set in at least one section of the premises that corresponds to a first zone based on a first zone definition stored in the storage device.

15. The system of claim 1, further comprising a buffer to store data captured by the plurality of sensors,
wherein the memory is configured to extract a portion of data from the buffer based on one or more predetermined rules.

16. The system of claim 15, wherein the one or more predetermined rules include at least one rule in which a size of the portion is based at least in part on a total amount of memory available in the system.

17. The system of claim 1, wherein the first zoning rule further comprises defining an area as a first zone when two more sensors detect events within the predetermined time window at least a first threshold number of times within the area.

18. A method comprising:
capturing data with a plurality of network connected sensors installed in or around a premises;
storing at least a sampling of the data in an electronic storage device;
analyzing the stored data with a processor to automatically identify one or more types of trends or patterns;
creating, based on the analysis, a zone definition for a first zone that corresponds to an area of the premises from which data was captured by one or more sensors selected from among the plurality of sensors, each zone definition including a designation of one or more sensors from among the plurality of sensors; and controlling at least one system operating in or around the premises automatically based on the first zone definition, wherein the first zone is defined by one or more zoning rules, a first zoning rule being to search for data sets that indicate two or more sensors have captured events simultaneously or within a predetermined time window.

19. The method of claim 18, wherein at least one zone definition includes one or more trait value components that indicate one or more traits of the zone.

20. The method of claim 19, wherein at least one of the one or more trait values indicates an occupancy level of the corresponding zone.

21. The method of claim 19, wherein at least one of the one or more trait values indicates a traffic level of the corresponding zone.

22. The method of claim 18, wherein the at least one other system includes a security system.

23. The method of claim 22, wherein a security mode of the security system is automatically set in at least one section of the premises that corresponds to a first zone based on a first zone definition stored in the storage device.

24. The method of claim 18, wherein the at least one other system includes a heating, ventilation, and air conditioning ("HVAC") system.

25. The method of claim 24, wherein a temperature setting of the HVAC system is automatically set in at least one section of the premises that corresponds to a first zone based on a first zone definition stored in the storage device.

26. The method of claim 18, wherein the first zoning rule further comprises defining an area as a first zone when two more sensors detect events within the predetermined time window at least a first threshold number of times within the area.

* * * * *